Patented Oct. 20, 1936

2,057,999

UNITED STATES PATENT OFFICE 2,057,999

CHLORINATED RUBBER COATING COMPOSITION

Walter D. Bowlby, Wilmington, Del., assignor to Hercules Powder Company, Wilmington, Del., a corporation of Delaware No Drawing. Application October 16, 1934, Serial No. 748,452

5 Claims. (Cl. 134—17)

This invention relates to an improved form of coating composition containing chlorinated rubber as the base.

Chlorinated rubber is produced by the action of chlorine on raw or vulcanized rubber, and contains from 30% to 80% chlorine depending upon the procedure used in its production. U. S. Patents 1,234,381, 1,544,529, 1,544,530, and 1,852,043 among others describe in detail various methods for the production of chlorinated rubber. While chlorinated rubber is readily soluble in cheap solvents and is possessed of great resistance to weathering and to chemical action, it cannot be used alone to form satisfactory protective coatings because of the brittleness and lack of adhesion of such coatings. It has accordingly been customary to modify the properties of chlorinated rubber films used as protective coatings by the addition of a plasticizing agent to the coating composition from which the film is deposited. It has, however, been difficult to plasticize chlorinated rubber satisfactorily without at the same time adversely affecting the resistance to weathering, light discoloration and chemical attack of the protective coating produced.

In accordance with this invention it has been found that chlorinated paraffin may advantageously be used to plasticize chlorinated rubber coating compositions, and that the protective coatings formed from compositions so plasticized are greatly superior to those hitherto known to the art. The coating composition in accordance with this invention will accordingly comprise essentially chlorinated rubber, chlorinated paraffin and a solvent. In addition to these ingredients the coating composition may contain, in any desired amounts, resins, drying oils, pigments, etc.

The chlorinated rubber used in the coating compositions in accordance with this invention may be either chlorinated raw rubber or chlorinated vulcanized rubber or both. For the best results it should have a chlorine content above 50%, and preferably of about 67% or higher. It may be of any desired viscosity, although for use in coating compositions which are to be sprayed a viscosity of about 60 centipoises in 20% solutions in xylol at 25° C. is to be preferred.

The chlorinated paraffin used in coating compositions in accordance with this invention may be of any suitable type, either liquid or solid, and may be produced by any of the known methods for its production, as, for example, those disclosed in U. S. Patents 1,129,165 and 1,380,067. The compatibility of chlorinated rubber and chlorinated paraffin is dependent upon the chlorine content of the chlorinated paraffin. Thus chlorinated paraffin containing less than 26–27% chlorine is incompatible in a ratio of 10 parts chlorinated rubber to 2 parts chlorinated paraffin. Chlorinated paraffin containing 29% chlorine is, however, compatible in a ratio of 10:4, and a product containing 45% or more chlorine is compatible in a ratio of 10:10. It will be seen, therefore, that when it is desired to include a relatively high percentage of chlorinated paraffin in the coating composition, a product containing about 50% chlorine should be selected, but that when only a relatively low percentage of chlorinated paraffin is to be included, a product containing as little as 30% chlorine may be employed. The chlorinated rubber and chlorinated paraffin may be included in coating compositions in accordance with this invention in any proportions in which they are compatible. As will be hereinafter shown, however, for certain purposes it is desirable to keep the ratio of these two ingredients within certain limits.

The composition will contain, in addition to chlorinated rubber and a chlorinated paraffin, a suitable solvent or solvent mixture whereby the essential ingredients will be blended and a solution formed of viscosity or fluidity such as to enable its application to a surface to be coated, as by brushing, spraying, dipping, or otherwise. The solvent or solvent mixture will be of a volatile nature and will act as a vehicle, being wholly or largely removed by evaporation after application of the compositions to a surface for the formation of a film. The solvent may be of any suitable type for the purpose, for example, toluol, xylol, ethyl acetate, butyl acetate, naphtha (high flash), or chlorinated solvents, as ethylene dichloride, carbon tetrachloride, or mixtures thereof. The solvent will be a solvent for other ingredients which may be included in the composition, and will be used in amount to give the viscosity desired.

In addition to the essential ingredients, chlorinated rubber and a chlorinated paraffin, the composition may contain various other ingredients, as for example, a resin such as coumarone resin, ester gum, etc.; a plasticizer, as dibutyl phthalate; and pigments. Ingredients which may be included in the composition, in addition to chlorinated rubber and chlorinated paraffin, may be included in varying amounts, as may be dictated by the purpose for which the composition is intended.

As illustrative of compositions in accordance with this invention, satisfactory for various uses, the following formulæ may be cited:

|  | 1 | 2 | 3 | 4 | 5 |
|---|---|---|---|---|---|
|  | Parts | Parts | Parts | Parts | Parts |
| Chlorinated rubber | 20 | 20 | 20 | 20 | 20 |
| Chlorinated paraffin (20-70% Cl₂) | 5 | 8 | 10 | 15 | 20 |
| Solvent | 75 | 72 | 70 | 65 | 60 |
| Resins, drying oils, pigments, etc. in quantity desired |  |  |  |  |  |

Coating compositions having the above formulæ will be found advantageous for various purposes, and more particularly, with respect to Formulæ 2, 3, 4 and 5, for the formation of films or coatings on metal surfaces. It will be found that the films so formed are very resistant to light and to chemical action and have unusual adhesion to polished metal surfaces such as duraluminum and polished copper. They are also very resistant to mechanical abrasion, such as occurs in the forming of metal sheets into particular shapes. Formula 2, given above, produced with a chlorinated paraffin containing 45% chlorine, when brushed on steel or duraluminum panels shows quite outstanding adhesion. The panels may be bent back and forth several times without cracking the film, or loosening it from the metal. The same degree of adhesion may be obtained on duraluminum with a composition including chlorinated paraffin containing about 40% chlorine.

The degree of adhesion, like the compatibility, is a function of the chlorine content of the paraffin. With the same content by weight of chlorinated paraffin in the chlorinated rubber film, a chlorinated paraffin containing 30% chlorine gives poorer adhesion to metal surfaces than one containing 45% or 50% chlorine.

The light resistance of chlorinated rubber films plasticized with chlorinated paraffin is excellent. Steel and duraluminum panels coated with films plasticized with chlorinated paraffin containing 45% chlorine were exposed 20 hours to the direct radiation of a mercury ultra-violet arc, in comparison with similar panels coated with chlorinated rubber plasticized with dibutyl phthalate. The films plasticized with chlorinated paraffin discolored very slightly, and much less than those containing dibutyl phthalate. The adhesion of the films plasticized with chlorinated paraffin was better, after the exposure, than the ones containing dibutyl phthalate, since the latter had become very brittle.

As protective coatings for use on metal surfaces pigmented chlorinated rubber-chlorinated paraffin compositions are extremely valuable. The following formulæ are examples of useful protective coatings for use on metals:

|  | 6 | 7 |
|---|---|---|
|  | Parts | Parts |
| Chlorinated rubber (60 cp.) | 20 | 20 |
| Chlorinated paraffin (50% chlorine) | 20 | 15 |
| Pigment (Indian red) | 15 | 15 |
| Solvent (toluol or xylol) | 65 | 65 |

If a lower ratio of chlorinated rubber to chlorinated paraffin than 20:25 is used, the film is too soft, and if much more than 20:8 the film is too brittle. The lower the chlorine content of the chlorinated paraffin, the greater the brittleness and, as stated above, the poorer the adhesion.

Compositions for use in wood finishing are similar to those for metal coating, and, of course, vary with the type of finish desired. The following formulæ have been found to give satisfactory wood finishing compositions:

|  | 8 | 9 | 10 | 11 | 12 | 13 |
|---|---|---|---|---|---|---|
| Chlorinated rubber | 20 | 20 | 20 | 20 | 20 | 20 |
| Chlorinated paraffin (50% chlorine) | 15 | 20 | 25 | 25 | 20 | 20 |
| Pigment (30 asbestine—70 titanium dioxide) | 53 | 63 | 72 | 72 | 72 | 72 |
| Ester gum |  |  |  | 5 |  |  |
| Oil modified alkyd resin |  |  |  |  | 5 |  |
| Polymerized indene resin |  |  |  |  |  | 5 |
| High flash naphtha | 110 | 110 | 110 | 110 | 110 | 110 |

On outdoor exposure, these formulæ give better weathering than similar formulæ in which dibutyl phthalate is used in place of chlorinated paraffin. As with the metal coating compositions, a ratio greater than 20:8 gives too brittle a film to be useful.

Compositions of chlorinated rubber plasticized with chlorinated paraffin are useful for coating cloth. The exact composition to be used depends on the mechanical structure of the cloth and the property desired. Thus, a composition containing equal parts by weight of chlorinated rubber and chlorinated paraffin is rather soft, while one containing four parts chlorinated rubber to one part chlorinated paraffin is rather stiff. These coatings are practically fireproof, due to the high chlorine content, and for this reason are very valuable for fireproofing draperies and similar articles of cloth. The compositions are waterproof, and are hence valuable for waterproofing.

Likewise, these compositions are valuable for coating paper. As with cloth coatings, the exact composition to be used will depend on the use to be made of the paper.

It will be understood that the details and examples set forth hereinabove are illustrative only, and that the invention as herein broadly described and claimed is not limited thereby.

What I claim and desire to protect by Letters Patent is:

1. A chlorinated rubber coating composition characterized by its ability to deposit a film showing marked resistance to chemical attack and abrasion and a high degree of adhesion to the surface covered thereby, said composition comprising chlorinated rubber, chlorinated paraffin wax having a chlorine content of at least 30% and a volatile solvent, the ratio of chlorinated rubber to chlorinated paraffin wax being within the range of from about 20:25 to about 20:8.

2. A chlorinated rubber coating composition characterized by its ability to deposit a film showing marked resistance to chemical attack and abrasion and a high degree of adhesion to the surface covered thereby, said composition comprising chlorinated rubber, chlorinated paraffin wax having a chlorine content of at least 45%, and a volatile solvent, the ratio of chlorinated rubber to chlorinated paraffin wax being within the range of from about 20:25 to about 20:8.

3. A chlorinated rubber coating composition characterized by its ability to deposit a film showing marked resistance to chemical attack and abrasion and a high degree of adhesion to the surface covered thereby, said composition comprising chlorinated rubber, chlorinated paraffin wax having a chlorine content of at least 45%, a resin, and a volatile solvent, the ratio of chlorinated rubber to chlorinated paraffin wax being within the range of from about 20:25 to about 20:8.

4. A chlorinated rubber coating composition characterized by its ability to deposit a film showing marked resistance to chemical attack and abrasion and a high degree of adhesion to the surface covered thereby, said composition comprising chlorinated rubber, chlorinated paraffin wax having a chlorine content of at least 45%, a drying oil, and a volatile solvent, the ratio of chlorinated rubber to chlorinated paraffin wax being within the range of from about 20:25 to about 20:8.

5. A chlorinated rubber coating composition characterized by its ability to deposit a film showing marked resistance to chemical attack and abrasion and a high degree of adhesion to the surface covered thereby, said composition comprising chlorinated rubber, chlorinated paraffin wax having a chlorine content of at least 45%, a pigment, and a volatile solvent, the ratio of chlorinated rubber to chlorinated paraffin wax being within the range of from about 20:25 to about 20:8.

WALTER D. BOWLBY.